United States Patent
Eschenburg

(10) Patent No.: US 7,779,725 B2
(45) Date of Patent: Aug. 24, 2010

(54) MODULAR BEARING CAGE WITH INTEGRATED LUBRICATION PUMP

(75) Inventor: Dale Eschenburg, Clinton Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1796 days.

(21) Appl. No.: 10/725,885

(22) Filed: Dec. 2, 2003

(65) Prior Publication Data
US 2004/0108169 A1      Jun. 10, 2004

Related U.S. Application Data

(60) Provisional application No. 60/432,342, filed on Dec. 10, 2002.

(51) Int. Cl.
*F16H 57/02*      (2006.01)
(52) U.S. Cl. .................... 74/606 R; 417/234; 417/374; 184/6.28; 184/6.12
(58) Field of Classification Search .................. 417/234, 417/374, 360; 74/606 R, 606 A; 184/6.28, 184/6.12
See application file for complete search history.

(56) References Cited

U.S. PATENT DOCUMENTS

| | | | | |
|---|---|---|---|---|
| 3,688,858 A | * | 9/1972 | Jespersen | 180/9.62 |
| 4,452,100 A | * | 6/1984 | Sullivan et al. | 475/88 |
| 4,468,981 A | * | 9/1984 | Ries | 475/225 |
| 5,311,740 A | * | 5/1994 | Shiba et al. | 60/453 |
| 6,770,005 B2 | * | 8/2004 | Aikawa et al. | 475/5 |

* cited by examiner

*Primary Examiner*—David M Fenstermacher
(74) *Attorney, Agent, or Firm*—Carlson, Gaskey & Olds

(57) ABSTRACT

A pump housing assembly includes a bearing cage assembly for supporting an input axle and a pump for communicating pressurized lubricant from a sump to specific driveline components. The pump housing assembly is installed to a gear housing that includes a gear assembly for driving axles supported within an axle housing. An input shaft is supported on a first end by the bearing cage within the pump housing assembly. The pump housing includes an inlet that communicates with oil contained within a sump of the gear housing. A rotor pump is driven by rotation of the input shaft to pump oil from the sump into passages defined within the input shaft. The passage within the input shaft communicates lubricant with the desired driveline components at a desired pressure.

4 Claims, 6 Drawing Sheets

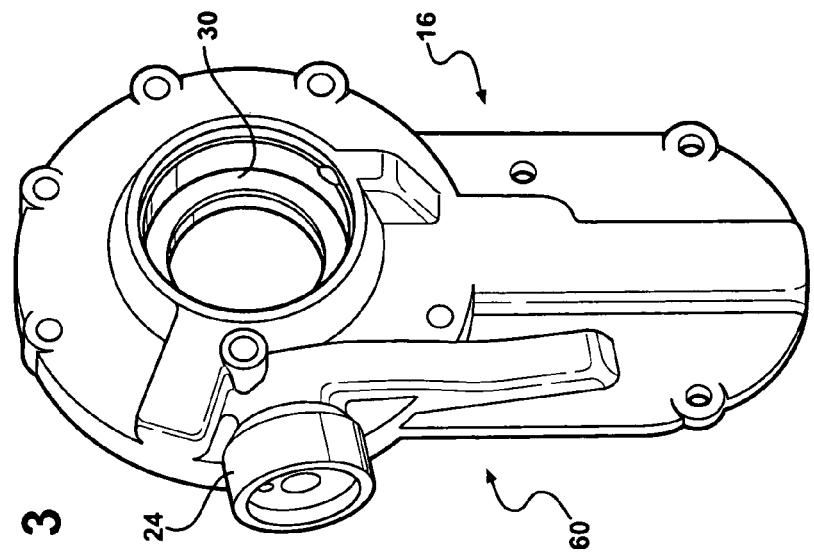
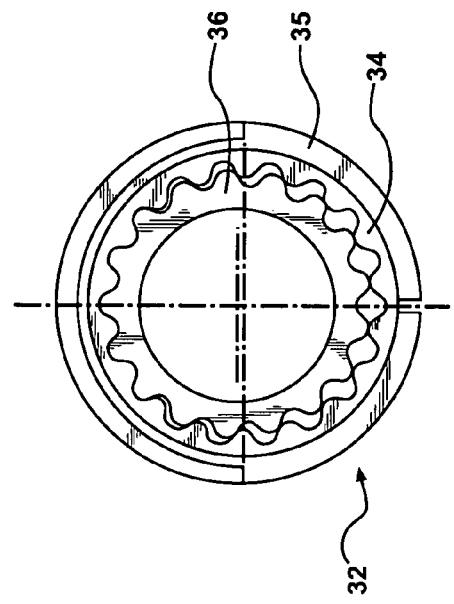
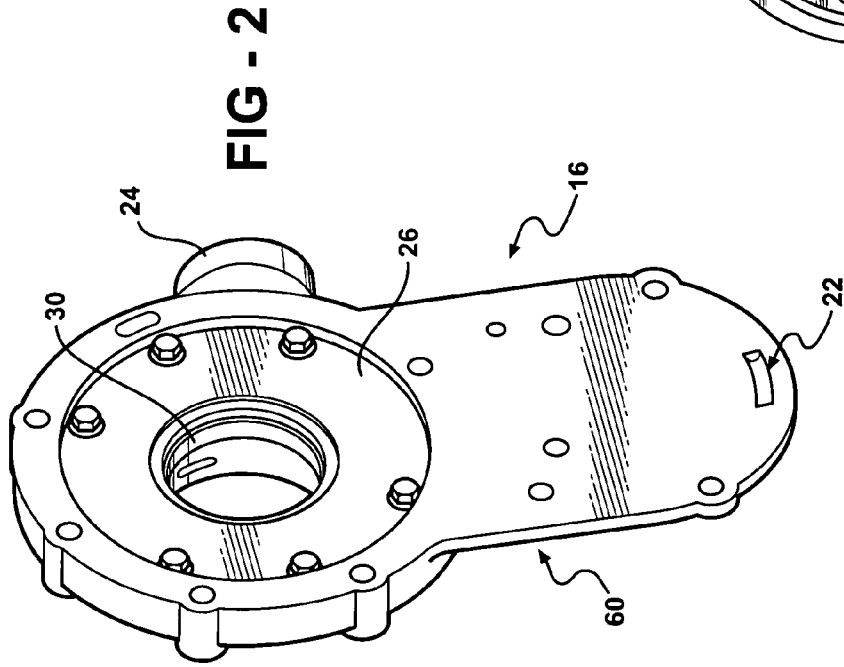

MODULAR BEARING CAGE WITH INTEGRATED LUBRICATION PUMP

This application claims priority to U.S. Provisional Application Ser. No. 60/432,342 filed Dec. 10, 2002.

BACKGROUND OF THE INVENTION

This invention generally relates to bearing cage assembly for an axle housing, and specifically to a bearing cage assembly including an oil pump for pumping oil from an oil sump to a driveline component.

Typically, an axle and input shaft for an axle assembly are supported by a bearing cage assembly mounted within a cover of a gear and axle housing. The bearing cage supports one end of the input shaft. The input shaft drives intermediate shafts that in turn drive the axles supported within the gear and axle housing.

The gear and axle housing contains lubricant that partially covers the working gears of the driveline components. Lubricant is sprayed about the interior of the gear and axle housing to lubricate those portions of the driveline that are not submerged within lubricant. Typically, covering and partially spraying lubricant within the gear and axle housing is sufficient for most applications. However, in extreme heavy-duty applications, where loads and speeds are greater than typical conditions, additional directed lubrication is beneficial for driveline components.

Prior art heavy duty gear and axle housings include oil pumps disposed within the gear and axle housing to direct lubricant to driveline components. Oil pumps within the gear and axle housing require specially designed housings and driveline components to accommodate and drive the oil pump. Such directly lubricated axle assemblies are typically prohibitively expensive and difficult to manufacture. Further, the need for specially configured housings and gear assemblies prevent usage of common components and adaptation to existing axle housings.

Accordingly, it is desirable to develop an oil pump for improving lubrication of driveling components installable without substantial modification to gear and axle assemblies.

SUMMARY OF THE INVENTION

The present invention is a pump housing assembly including a bearing cage assembly for supporting an input axle and a pump for communicating pressurized lubricant from a sump to specific driveline components.

The pump housing assembly is installed to a gear housing. The gear housing includes a gear assembly for driving axles supported within an axle housing. An input shaft is supported on a first end by the bearing cage within the pump housing assembly. The pump housing includes an inlet that communicates with oil contained within a sump of the gear housing. The pump housing includes an attachment boss for an oil filter. A rotor pump is driven by rotation of the input shaft. The rotor pump pumps oil from the sump into passages defined within the input shaft. The passage within the input shaft communicates lubricant with the desired driveline components at a desired pressure. The rotor pump includes a reversing ring that maintains flow of lubricant from the sump to the driveline components, regardless of the direction of rotation of the input shaft.

Accordingly, the pump housing assembly of this invention provides lubrication to driveline components without substantial modification to gear and axle assemblies.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 is perspective view of a back side of the pump housing assembly;

FIG. 3 is a perspective view of a front side of the pump housing assembly;

FIG. 4 is a plan view of the gear pump assembly;

DETAILED DESCRIPTION OF THE PREFERRED EMBODIMENT

Figure 1:
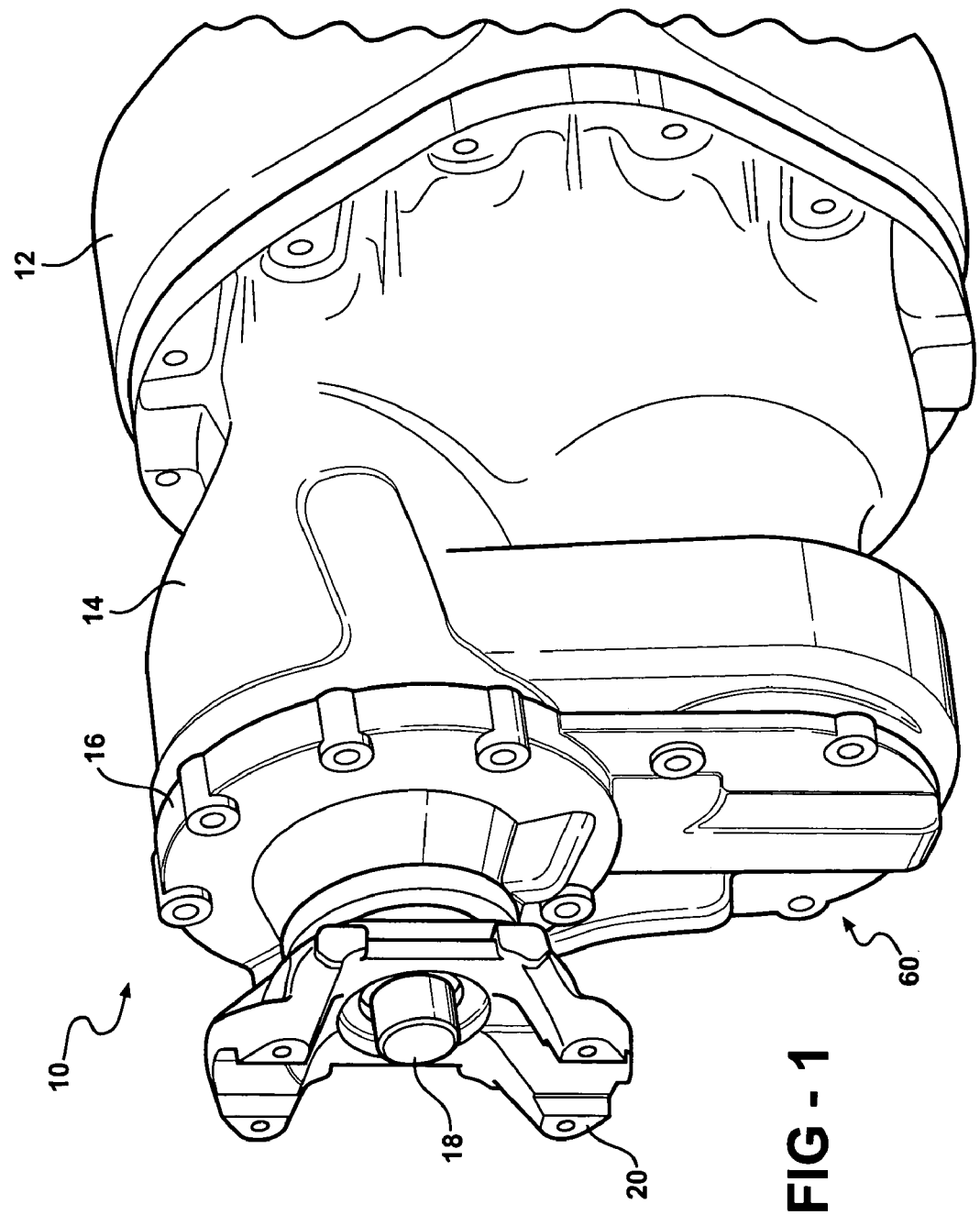
FIG. 1 is a perspective view of an axle assembly including a pump housing assembly according to this invention.

Referring to FIG. 1, an axle assembly 10 for a motor vehicle includes an axle housing 12 for supporting rotation of driven axles. A gear housing 14 is attached to the axle housing 12 and supports driveline components. An input shaft 18 is supported on a first end by a bearing cage supported by a pump housing 16. The input shaft 18 includes a yoke portion 20 for attachment to a driveshaft as is known to a worker skilled in the art.

Figure 7:
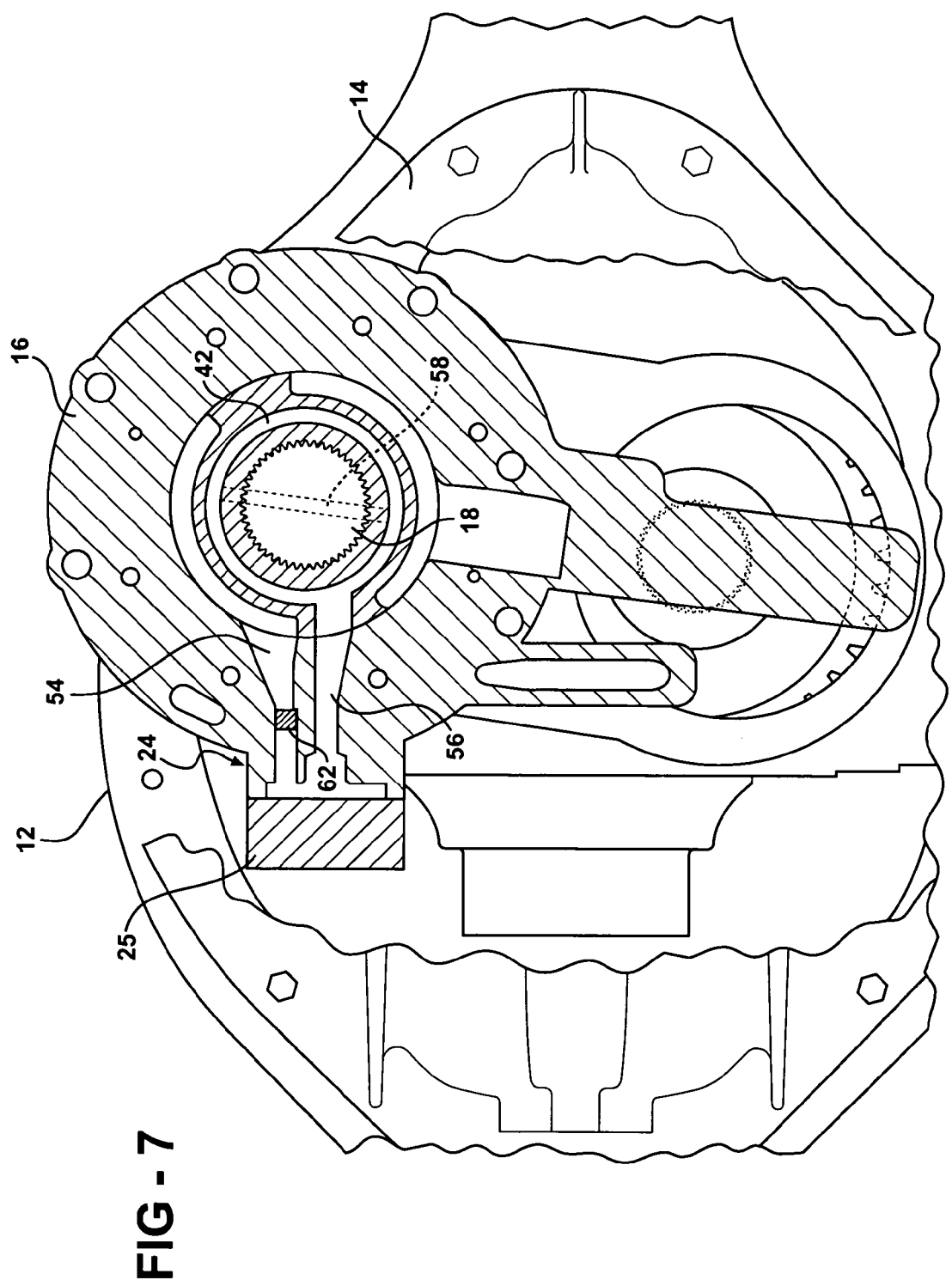
FIG. 7 is a front view of the bearing cage pump assembly.

Referring to FIGS. 2 and 3, the pump housing 16 includes a bearing cage assembly 30 for supporting the input shaft 18 for rotation. The pump housing 16 of this invention includes an elongated section 60 extending to cover an opening within the gear housing 14. The elongated section 60 includes an inlet 22 that communicates with oil contained within the bottom portion of the gear housing 14. The pump housing 16 includes an attachment boss 24 for an oil filter 25 (FIG. 7). Preferably a rotor pump assembly 32 (FIG. 4) is disposed within the pump housing 16.

Referring to FIG. 4, the rotor pump assembly 32 includes an inner gear 36 and an outer gear 34. Each of the gears 36, 34 are disposed within a reversing ring 35. The inner gear 36 is mounted to the input shaft 18. The outer gear 34 is mounted in a non-concentric manner relative to the inner gear 36. The teeth of the inner and outer gears mesh to create progressively reduced volumes that pull oil from the sump through the inlet 22. The reversing ring 35 engages when the input shaft 18 is driven in a reverse direction to allow for the continued pumping of oil. The reversing ring 35 reverses the position of an inlet and outlet to maintain the direction of oil flow regardless of the direction or rotor pump rotation. The specific operation of the gear pump assembly 32 is as known to a worker skilled in the art and other configurations of oil pumps are also within the contemplation of this invention.

Figure 5:
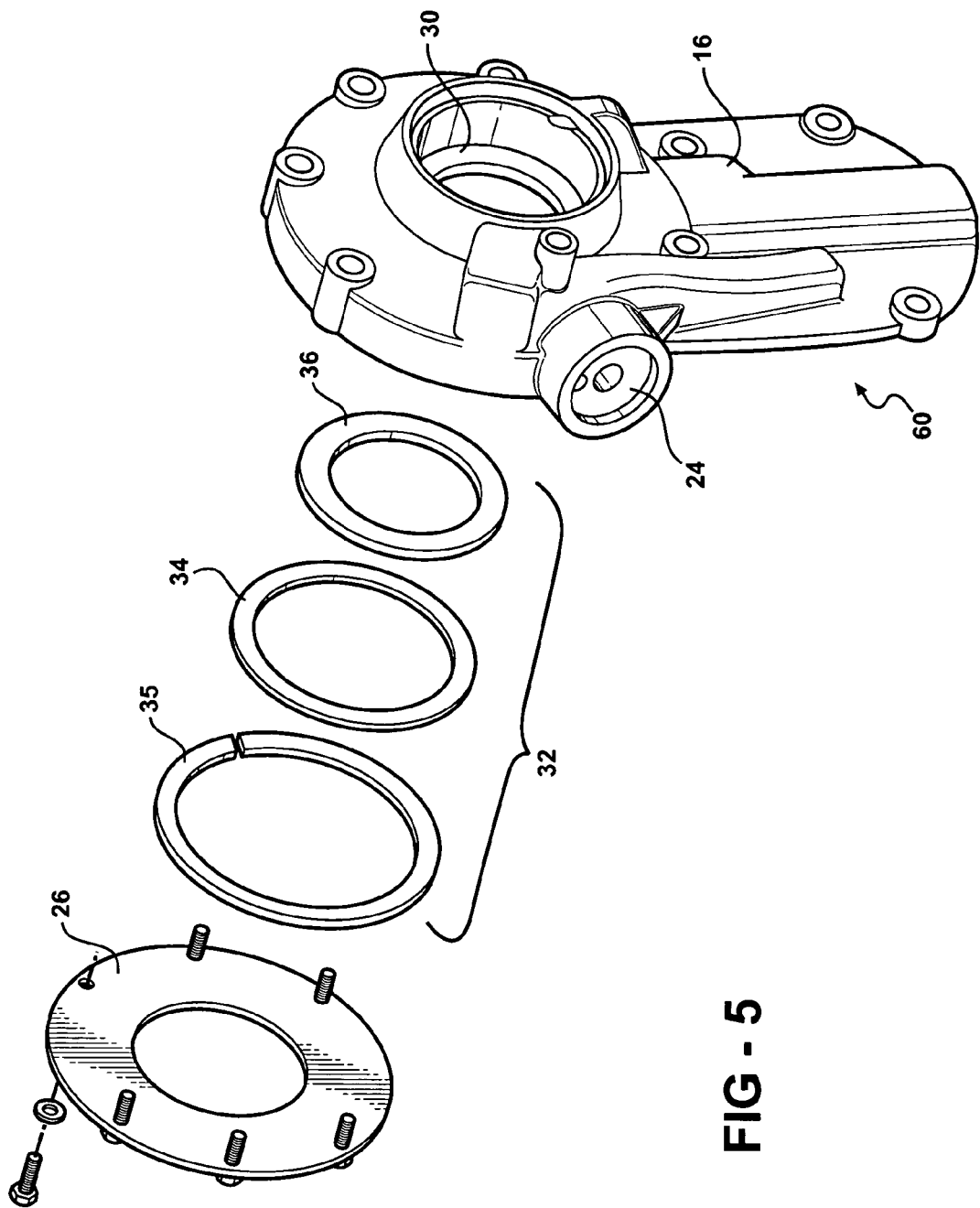
FIG. 5 is an exploded view of the gear pump assembly.

Referring to FIG. 5 an exploded view of the gear pump assembly 32 and the pump housing 16 is shown. The gear pump assembly 32 is secured within a cavity of the pump housing 16 by cover 26. The pump housing 16 is integrated into the bearing cage 30 that supports rotation of the input shaft 18.

Figure 6:
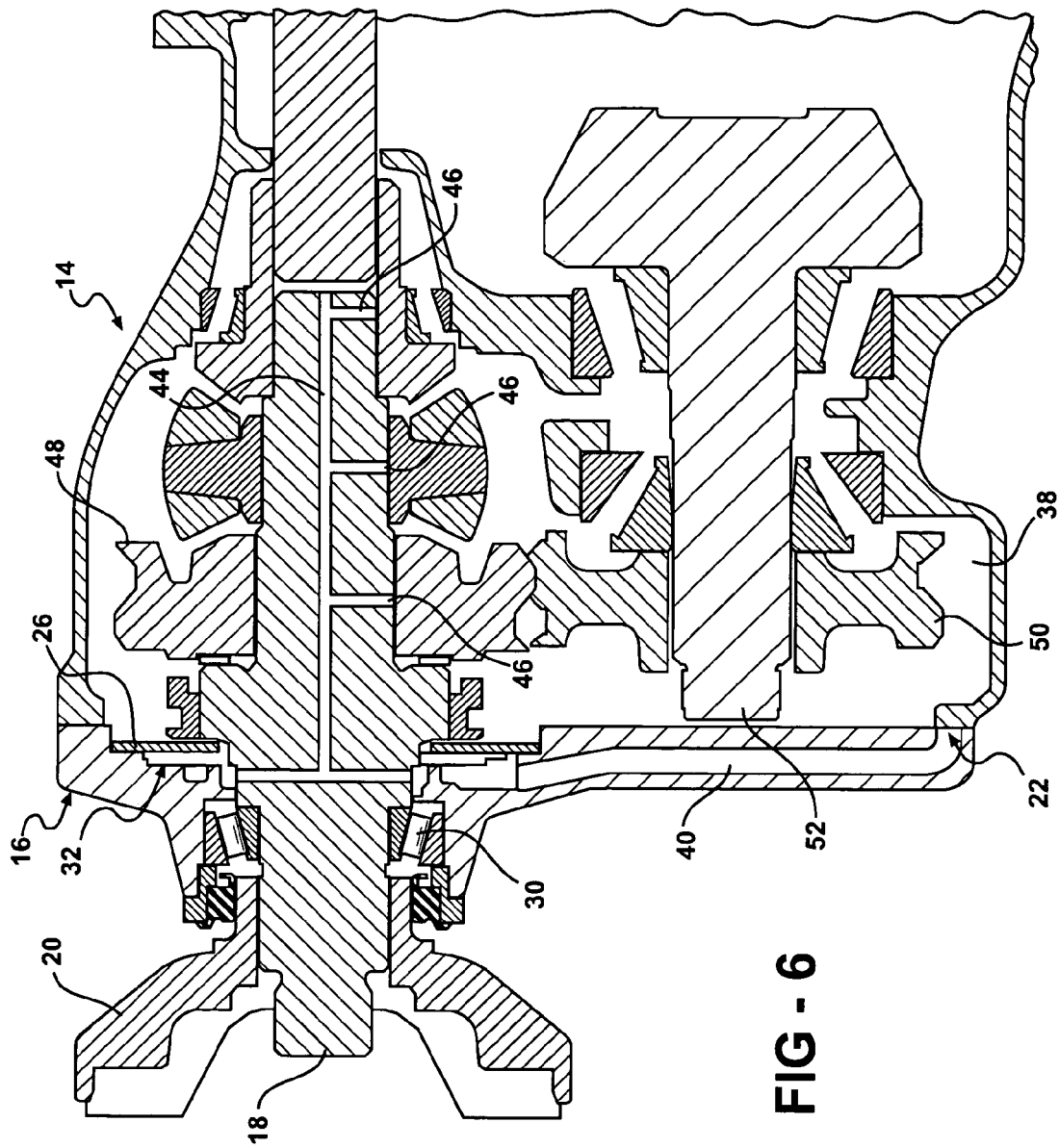
FIG. 6 is a cross-sectional view of the gear housing including driveline components and the pump housing assembly.

Referring to FIG. 6, the gear case housing 14 is shown in cross-section and includes the input shaft 18 with a first gear 48 driving a second gear 50 disposed on a pinion shaft 52. The input shaft 18 is supported by the bearing cage assembly 30. The bearing cage assembly 30 is supported within the pump housing 16. The elongated portion 60 includes an inlet passage 40. The inlet passage 40 extends downward to the inlet 22. The inlet 22 is in communication with a sump 38 of the gear housing 14 such that the inlet 22 is below the oil level within the sump 38.

Oil is pulled upward through the inlet 22 and inlet passage 40 by the rotor pump assembly 32. From the rotor pump assembly 32, oil is transmitted through passage 54 to the oil filter 25. A relief valve 62 (Schematically shown in FIG. 7) within the passage 54 controls the pressure of oil transmitted to the oil filter 25. The relief valve 62 prevents pressure from rising over a specified maximum pressure. Excess oil is directed back into the sump 38.

Oil flows through the oil filter 25 and back through exit passage 56 into an annular passage 42 surrounding the input shaft 18 (FIG. 7). The input shaft 18 includes an inlet passage 58 in communication with the annular passage 42. Oil within the inlet passage 58 flows through the bore passages 44 along the axis of the input shaft 18. Several outlet passages 46 extend from the bore passage 44 to distribute oil to various heavy wear areas of the driveline.

Figure 8:
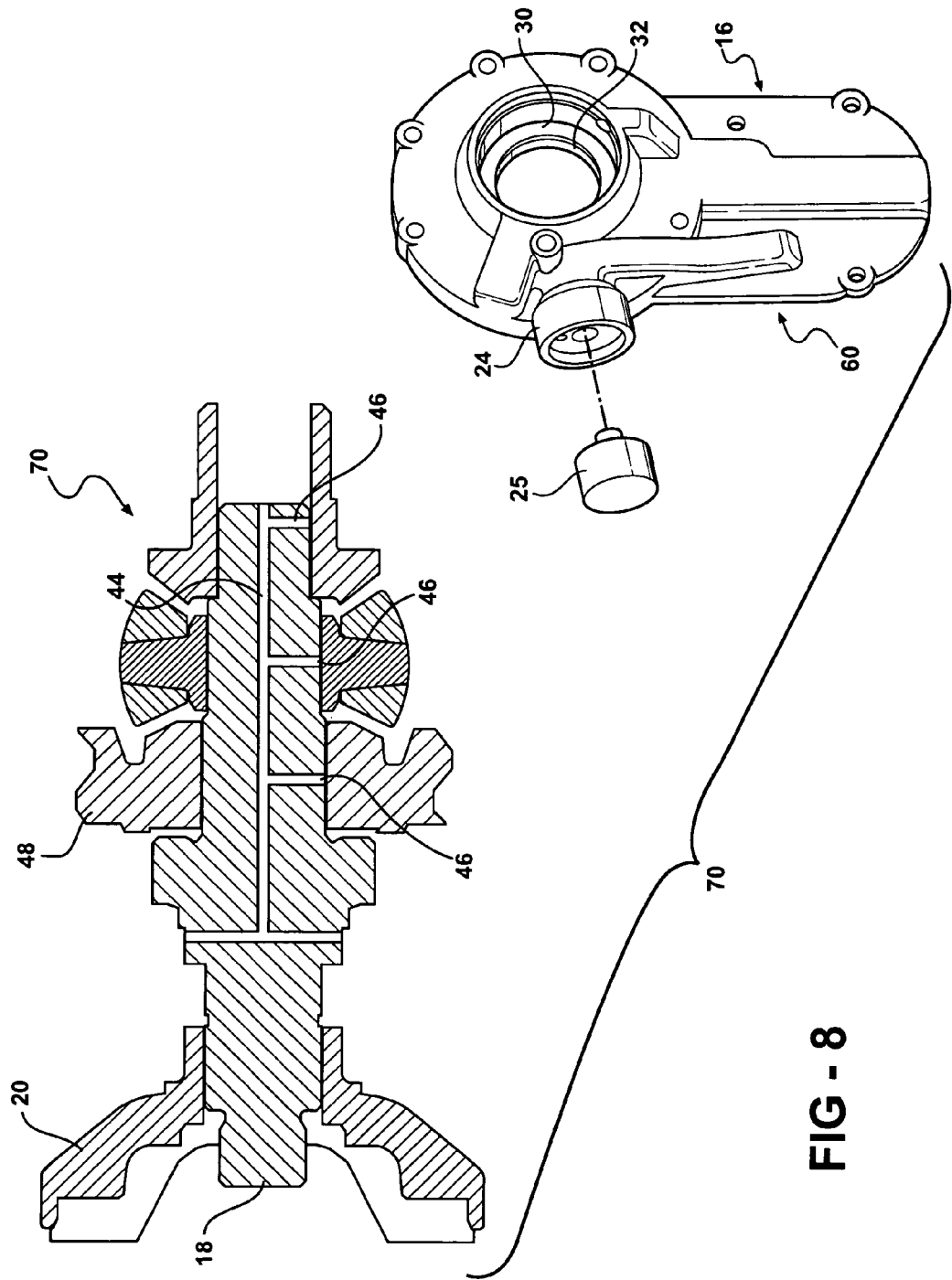
FIG. 8 is a view illustrating the components of a kit for installation into existing axle assemblies.

Referring to FIG. 8, a kit 70 is shown including the input shaft 18 and the pump housing 16. Existing axle assemblies can be retrofitted with the oil pump housing 16 of this invention to improve durability and performance. Retrofitting a currently operating axle simply requires replacing the axle assembly's cover and input shaft with the pump housing 16 and input shaft 18 supplied in the kit 70. The pump housing 16 of this invention includes the rotor pump assembly 32 that is driven by the input shaft 18. The input shaft 18 includes passages 44 and 46 for transmitting lubricant to desired areas within the axle housing.

The specific configuration of the pump housing assembly 16 and input shaft 18 are application specific, and a worker skilled in the art with the benefit of this disclosure would understand modifications necessary for adaptation to specific axle configurations. Because the rotor pump assembly 32 is mounted within the pump housing 16, no modification to the existing housing is necessary. Further, only replacement of the input shaft 18 is required to provide passages to direct lubricant to desired areas of the gear assembly.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An axle assembly comprising:
   an axle housing including an opening for an input shaft;
   a pump housing attached to the axle housing over said opening;
   a pump mounted within said pump housing and driven by said input shaft; and
   a bearing member supported within said pump housing separate from said axle housing for supporting rotation of said input shaft, wherein the pump housing includes an inlet in communication with a sump within said axle housing, a cavity defining a supply passage within said pump housing from said inlet to said pump, and an elongated section including said inlet and said cavity.

2. The assembly as recited in claim 1, wherein said input shaft includes a lubricant passage for communicating lubricant into said axle housing.

3. The assembly as recited in claim 2, wherein said lubricant passage comprise a first passage extending axially through said input shaft and a plurality of second passages in communication with said first passage that communicate lubricant outside said input shaft.

4. The assembly as recited in claim 1, wherein said input shaft drives a pinion shaft supported for rotation within said axle assembly.

* * * * *